United States Patent [19]

Perring et al.

[11] Patent Number: 4,621,867
[45] Date of Patent: Nov. 11, 1986

[54] EASY ENTRY SEAT ADJUSTER

[75] Inventors: John Perring, Sterling Heights; William J. Watkinson, Troy, both of Mich.

[73] Assignee: General Motors Corporation, Detroit, Mich.

[21] Appl. No.: 720,370

[22] Filed: Apr. 4, 1985

[51] Int. Cl.⁴ .............................................. B60N 1/04
[52] U.S. Cl. .................................. 297/341; 248/429; 297/346
[58] Field of Search ............... 297/340, 341, 344, 346, 297/337, 311; 248/429, 430, 419, 420, 393; 403/108

[56] References Cited

U.S. PATENT DOCUMENTS

| | | | |
|---|---|---|---|
| 3,940,182 | 2/1976 | Tamura | 297/341 |
| 4,101,169 | 7/1978 | Muraishi et al. | 297/341 |
| 4,143,911 | 3/1979 | Sakakibara et al. | 297/341 |
| 4,159,147 | 6/1979 | Kiyomitsu et al. | 297/341 |
| 4,384,701 | 5/1983 | Barley | 248/393 X |
| 4,422,690 | 12/1983 | Kopich | 297/341 |
| 4,440,442 | 4/1984 | Drouillard et al. | 297/341 |
| 4,508,385 | 4/1985 | Bowman | 297/341 |

FOREIGN PATENT DOCUMENTS

| | | | |
|---|---|---|---|
| 31424 | 3/1977 | Japan | 297/341 |
| 47923 | 4/1980 | Japan | 297/341 |

*Primary Examiner*—William E. Lyddane
*Assistant Examiner*—Thomas A. Rendos
*Attorney, Agent, or Firm*—Herbert Furman

[57] ABSTRACT

An easy entry seat adjuster includes upper and lower track members which are slidable relative to each other. A latch carrier is slidably mounted on both track members and mounts a latch member having latch arms engageable within an opening of the upper track member and any one of a series of openings in the lower track member. Manual movement of the latch member out of engagement with an opening of the lower track member permits horizontal adjustment of the seat as the latch member carrier and upper track member move relative to the lower track member. Movement of the latch member out of engagement with the opening of the upper track member by a seat back actuated cam on the upper track member permits displacement of the upper track member between a horizontally adjusted position and easy entry position.

8 Claims, 11 Drawing Figures

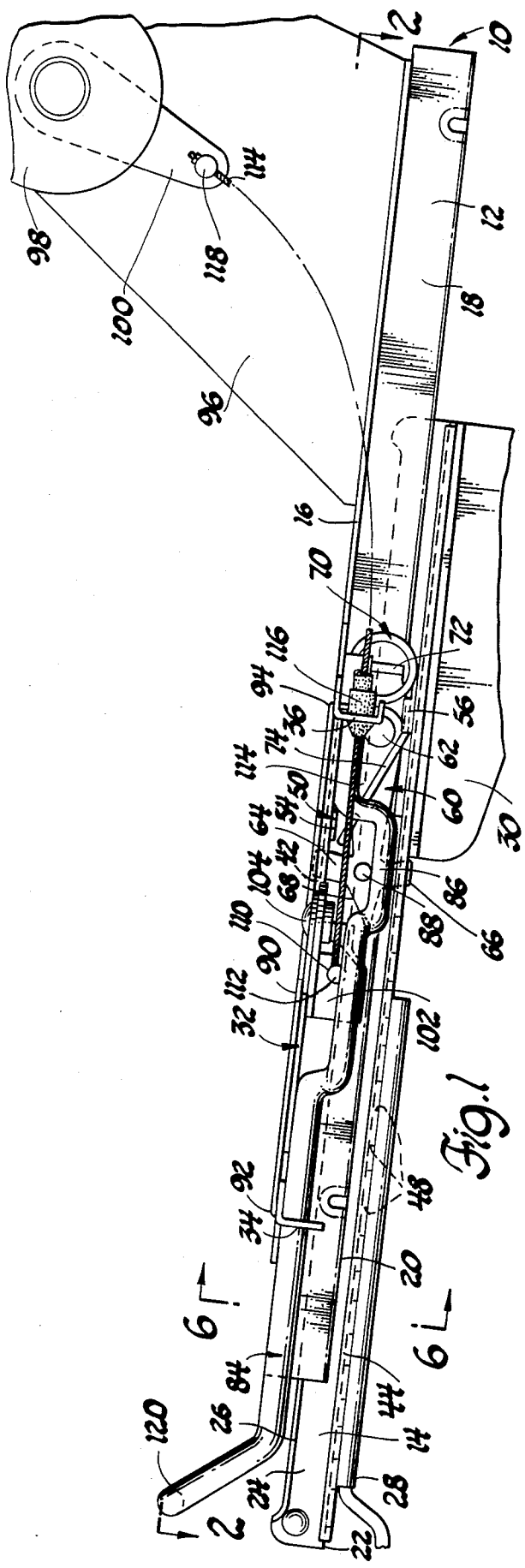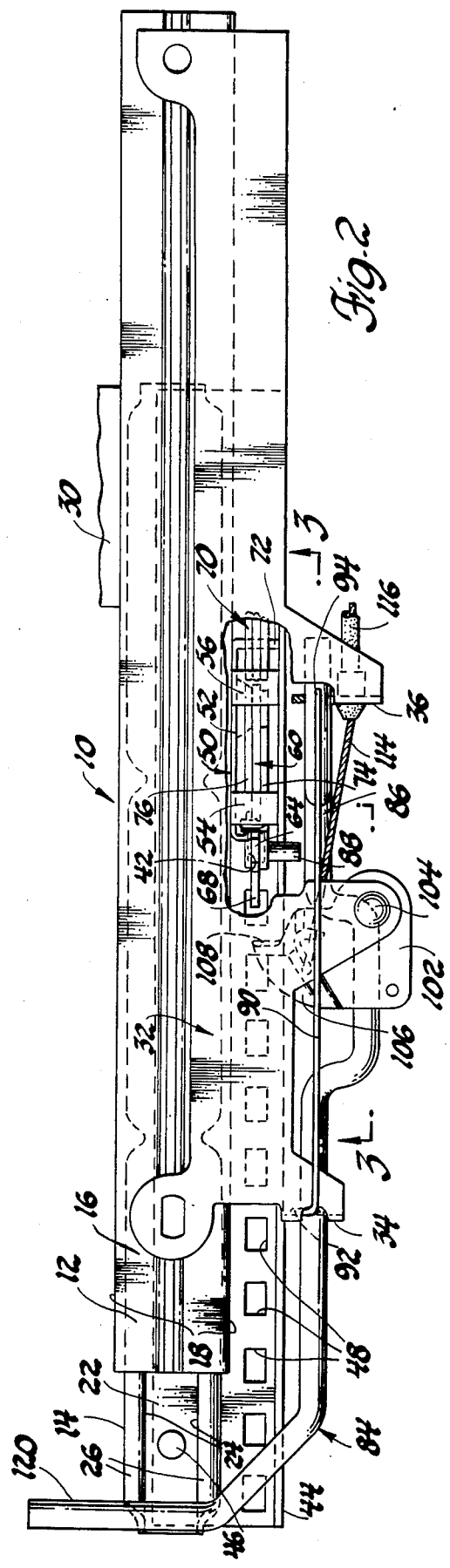

EASY ENTRY SEAT ADJUSTER

This invention relates generally to easy entry seat adjusters and more particularly to such seat adjusters for moving a vehicle seat to a plurality of horizontally adjusted positions and from an adjusted position to a forwardly displaced easy entry position and return to the adjusted position.

Easy entry seat adjusters of this general type are well known. Such adjusters generally include a pair of track members which are horizontally slidable relative to each other and are interconnected in various manners to obtain horizontal adjustment as well as movement between a horizontal adjusted or initial starting position, a forwardly displaced easy entry position, and return to the initial starting position.

One of the features of this invention is that it provides an easy entry seat adjuster which includes a pair of upper and lower track members and a latch mechanism which is latchable to both track members or is latchable to one track member and released from the other to provide various combinations of horizontal movement of the track members relative to each other. When the latch mechanism latches the track members to each other, the track members are releasably latched in one of a plurality of horizontally adjusted positions. When the latch mechanism is released from the lower track member while remaining latched to the upper track member, the upper track member and latch mechanism can be moved as a unit to another horizontal adjusted position relative to the lower track member. The reengagement of the latch mechanism with the lower track member latches the track members to each other in the new horizontally adjusted position. When the latch mechanism is released from the upper track member while remaining latched to the lower track member, the upper track member can be horizontally moved from an initial starting position to a forwardly displaced easy entry position and can be returned to the initial starting position wherein the latch mechanism reengages the upper track member so that the upper track member is again latched to the lower track member in the initial starting position.

Another feature is that the latch mechanism is releaseable from the lower track member by actuation of an operator and is releaseable from the upper track member by tilting movement of the seat back of a vehicle seat mounted to the upper track member. A further feature is that the latch mechanism includes a carrier which is slidable relative to both track members and mounts a latch member having arms which are engageable within openings in each of the track members, with the upper track member including one opening and the lower track member including a plurality of openings, each of which is pairable with the one opening to define a horizontally adjusted position of the track members relative to each other. Yet another feature is that the latch mechanism is resiliently located in a normal neutral position wherein the latch arms engage in openings of both track members and is moved against a resilient bias to a position wherein one latch arm engages an opening of one track member while the other latch arm is disengaged from an opening of the other track member.

These and other features will be readily apparent from the following specification and drawings wherein:

FIG. 1 is a side elevational view of an easy entry seat adjuster according to this invention.

FIG. 2 is a partially broken away top plan view taken generally along line 2—2 of FIG. 1.

Figure 3:
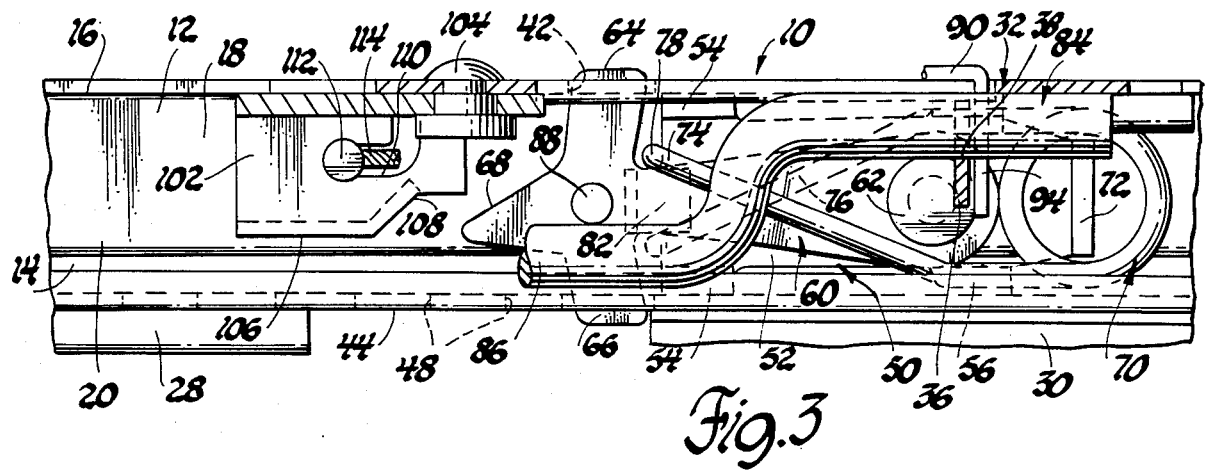
FIG. 3 is an enlarged view taken along line 3—3 of FIG. 2.

Referring now particularly to FIGS. 1 through 9 of the drawings, an easy entry seat adjuster 10 according to this invention includes an upper track member 12 and a lower track member 14. The track members 12 and 14 are conventional. As shown in FIGS. 6 through 9, the upper track member 12 includes a base wall 16, a pair of depending side walls 18 and a pair of arcuate terminal flanges 20. The lower track member 14 includes a base wall 22 which is juxtaposed to wall 16, a pair of side walls 24 which are juxtaposed to respective side walls 18, and a pair of arcuate terminal flanges 26 which are juxtaposed to respective terminal flanges 20. The lower track member 14 is supported on the floor pan of a vehicle body by front and rear support brackets 28 and 30 respectively. The upper track member 12 is supported on the lower track member 14 for horizontal sliding movement by a bearing assembly, not shown, which can either be conventional or as shown in copending application Ser. No. 709,881 Bearing Assembly for Seat Slide Structures, filed Mar. 8, 1985, Rees, and assigned to the assignee of this invention.

An upper control plate 32 is welded to the base wall 16 of track member 12 and is cantilevered outwardly therefrom. The control plate 32 includes a forward depending apertured ear 34 and a rearward depending ear 36 which is apertured at 38 and slotted at 40, for purposes to be described. The control plate 32 also includes a single closed slot or opening 42.

A lower control plate 44 is secured to the base wall 22 of the track member 14 by the same rivets 46 which secure the bracket 28 thereto. The control plate 44 is cantilevered outwardly of the track member 14 and includes a series of closed slots or openings 48 any one of which is pairable with the opening 42 to define a horizontally adjusted position of the upper track member 12 relative to the lower track member 14 as will be further described.

Figure 4:
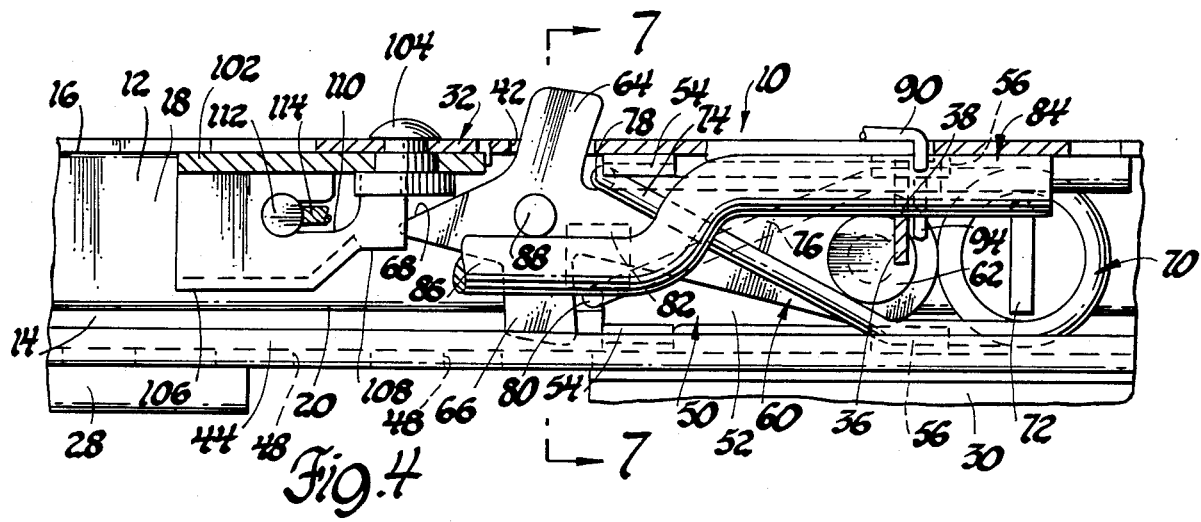
FIG. 4 is a view similar to FIG. 3 and showing the latch mechanism released from the lower track member to pemit horizontal adjustment of the upper track member and latch mechanism relative to the lower track member.
Figure 5:
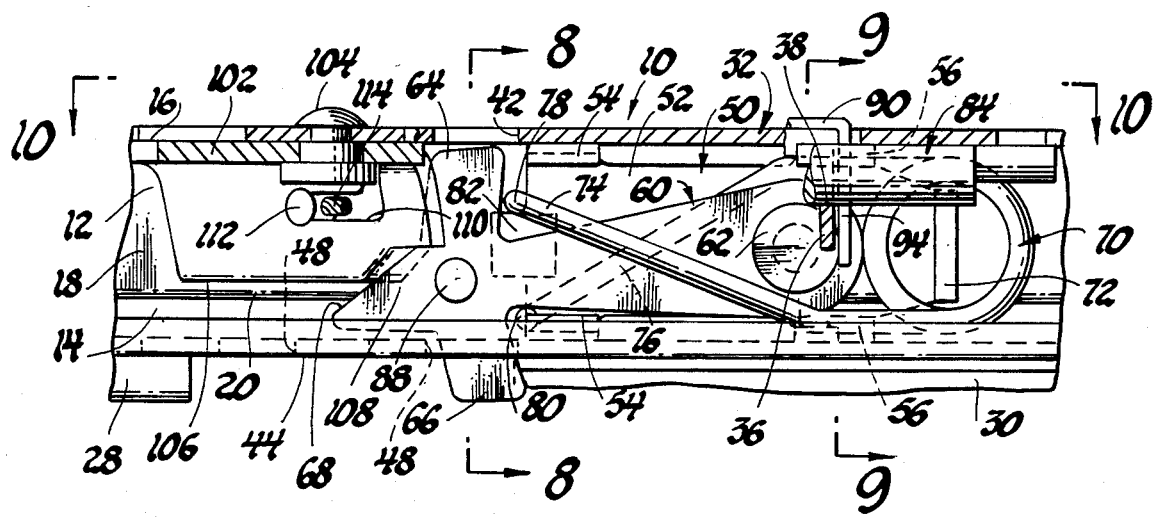
FIG. 5 is a view similar to FIG. 4 and showing the latch mechanism released from the upper track member to permit horizontal movement of the upper track member from an initial starting position to a forwardly displaced easy entry position and return to the initial starting position.
Figure 6:
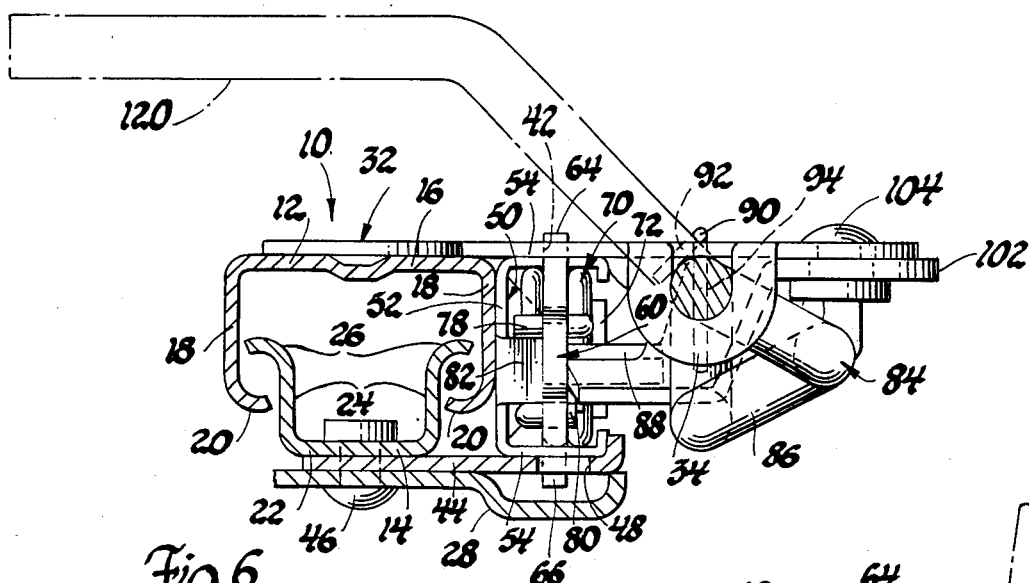
FIG. 6 is an enlarged view taken along line 6—6 of FIG. 1.

The latch mechanism for the track members 12 and 14 includes a carrier member 50 having a base wall 52 which abuts the outboard side wall 18 of the upper track member 12 and spaced pairs of front and rear outwardly extending legs 54 and 56. The upper legs 54 and 56 frictionally engage the lower surface of the upper control plate 32 and the lower legs 54 and 56 frictionally engage the upper surface of the lower control plate 44. The base wall 52 of the carrier includes an outwardly offset embossment 58, FIGS. 9 and 10, which pivotally mounts a latch member 60 at 62. The latch member 60, as best shown in FIGS. 3 through 5, includes a pair of oppositely extending upper and lower latch arms 64 and 66 respectively and a forwardly extending nose or cam edge portion 68.

A hairpin type spring 70 is coiled around a lateral tab 72 of the carrier 50. The arms 74 and 76 of the spring cross each other, FIGS. 3 through 5, and have their respective lateral ends 78 and 80 engaging the upper and lower sides of latch member 60 and a lateral tab 82 of the carrier 50.

A manually operable release rod 84 is journaled in the apertured ear 34 of the upper carrier 32 and also within the aperture 38 of ear 36. The release rod includes a crank portion 86, FIGS. 2 and 6, which is located adjacent a lateral pin 88 of the latch member 60. A wire spring 90 has its forward bent end 92 hooked within the opening of the ear 34, FIG. 2, and its rearward bent end 94 received within a bore through the release rod 84. The spring 90 maintains the release rod 84 in its unactuated position shown in FIGS. 2 and 6 and resists clockwise movement thereof as viewed in FIGS. 6 through 8 inclusive.

A conventional vehicle seat, not shown, is mounted on the upper track member 12 and includes a support bracket schematically indicated at 96 in FIG. 1 which mounts a forwardly tilting seat back 98 of the seat. Structure such as this is conventional and is threfore not shown in detail. A lever 100 is fixed to the seat back 98 for movement with the seat back between a normal upright position as shown in FIG. 1, and a tilted position, counterclockwise of this normal position, not shown.

Figure 7:
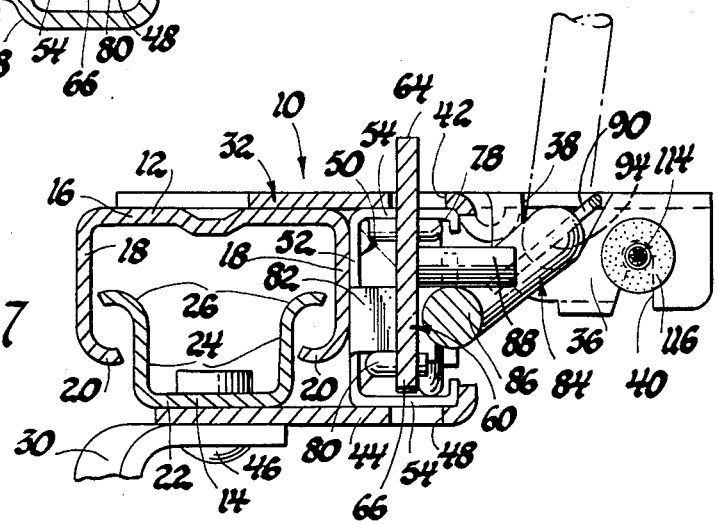
FIG. 7 is a view taken along line 7—7 of FIG. 4.
Figure 8:
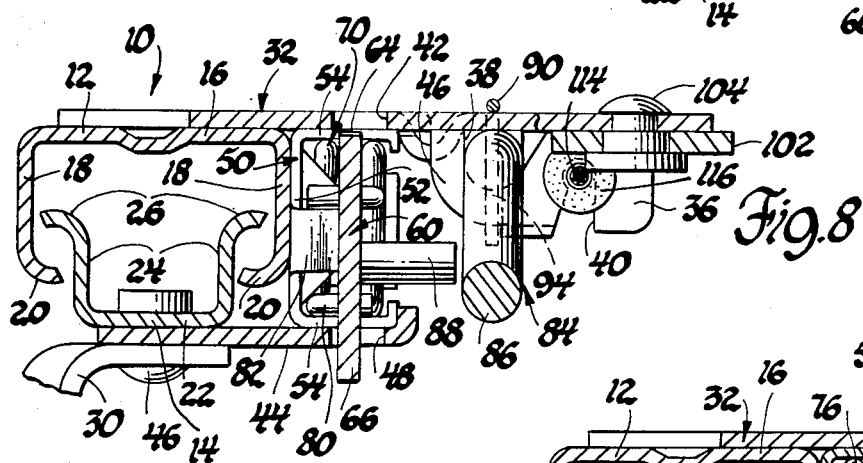
FIG. 8 is a view taken along line 8—8 of FIG. 5.
Figure 9:
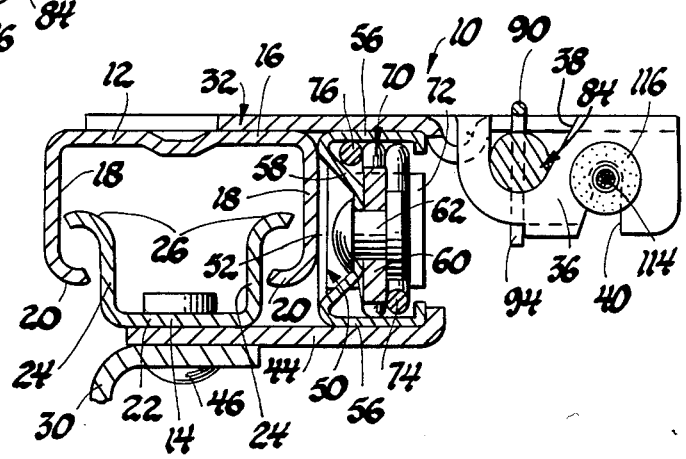
FIG. 9 is a view taken along line 9—9 of FIG. 5.
Figure 10:
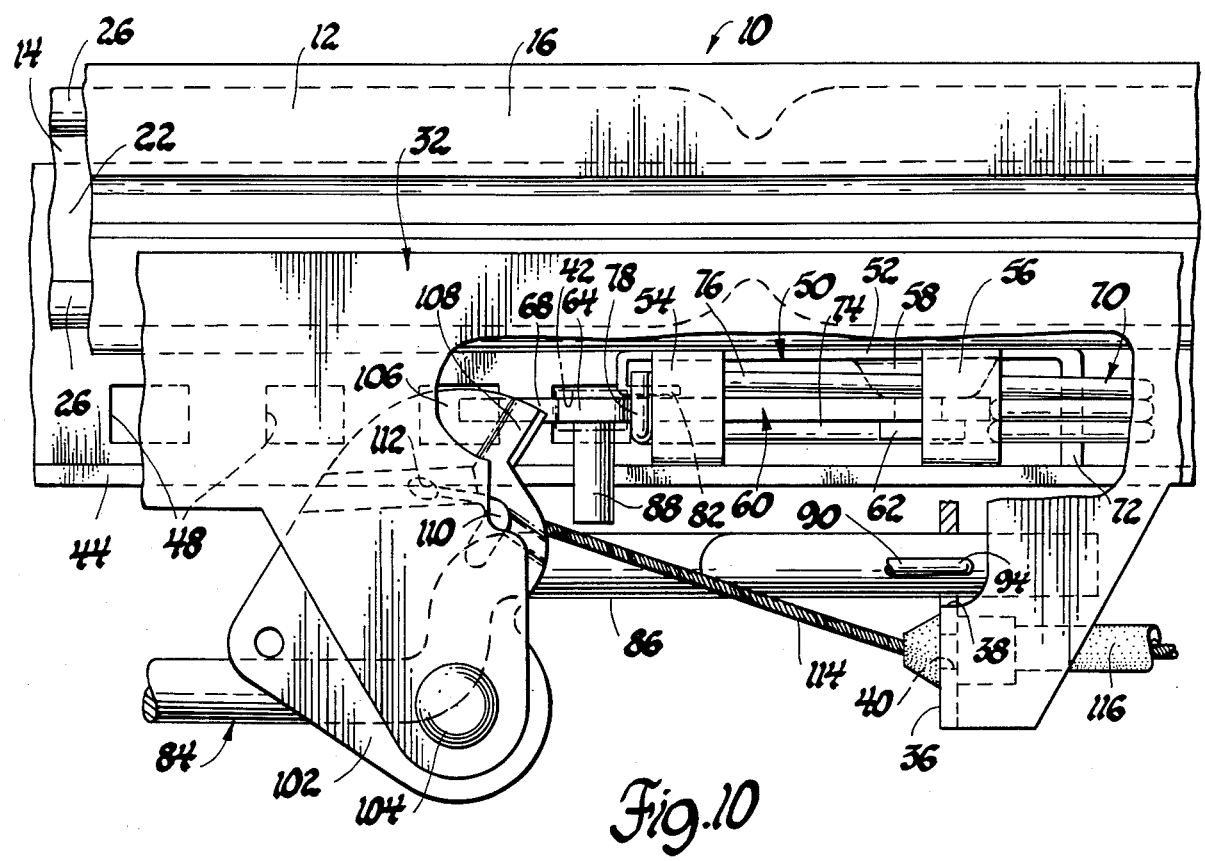
FIG. 10 is a partially broken away view taken along line 10—10 of FIG. 5.
Figure 11:
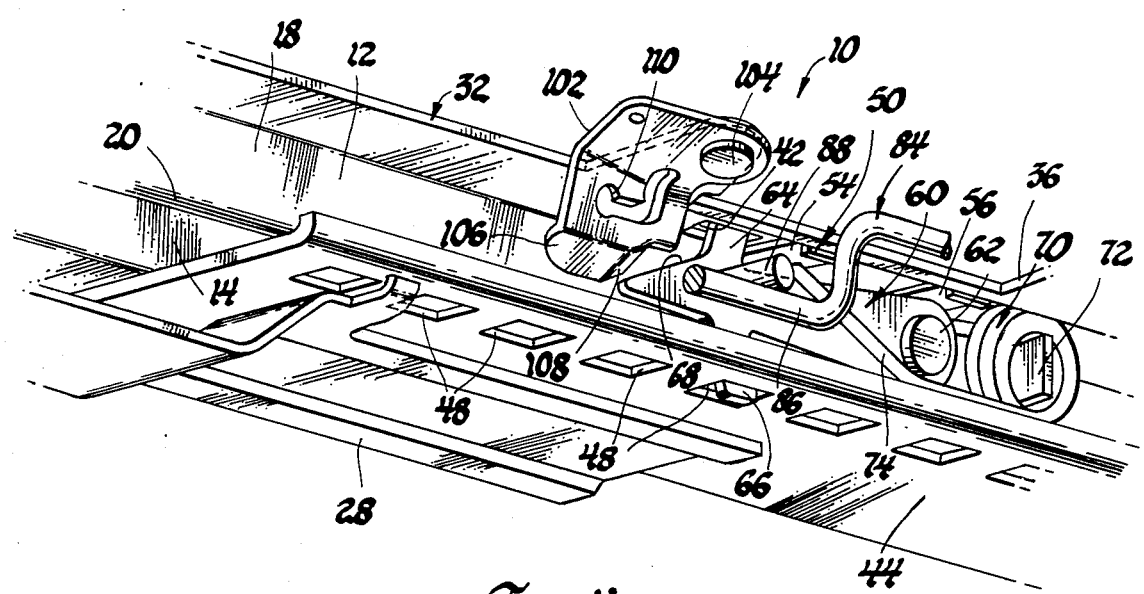
FIG. 11 is a partial perspective view.

A cam plate 102 is pivoted at 104 to the upper control plate 32. The cam plate is best shown in detail in FIGS. 10 and 11 and includes an offset portion 106 having a cam edge 108 which is engageable with the cam edge portion 68 of the latch member 60 as will be described. The offset portion 106 of the cam member is key slotted at 110 and receives a ball 112 attached to the forward end of a flexible cable 114, FIGS. 1 and 10. A partial sheath 116 for the cable has its forward grooved end anchored within the slot 40 of ear 36 as shown in FIGS. 7, 8 and 9. The rearward end of the cable 114 is secured at 118 to the lever 100 as shown in FIG. 1.

Assume now that the track members 12 and 14 are in the position shown in FIGS. 1 and 2 and it is desired to move the upper track member 12 to another horizontal adjusted position. The seat occupant will grasp the handle portion 120 of the release rod 84 and rotate this rod clockwise, as viewed in FIGS. 6 and 7, within ears 34 and 36 of the upper control plate 32. This engages the crank portion 86 of the rod with the lateral pin 88 of the latch member 60 to move the latch member 60 from its latched position shown in FIGS. 3 and 6 to its first released position shown in FIGS. 4 and 7. The rotational movement of the release rod 84 is against the bias of the spring 90 and the movement of the latch member to the first released position is against the bias of the upper arm 74 of the spring 70. When the latch member moves to this released position, the arm 66 thereof moves out of engagement with the opening 48 of the lower control plate 44 so that the upper track member 12, the carrier 50 and the latch member 60 move as a unit relative to the lower track member 14 to another horizontally adjusted position. When the desired position is attained the operator releases the handle portion shown in FIG. 6 and the spring arm 74 returns the latch member 60 into engagement with the opening 48 of the lower control plate 44 which is at or adjacent the desired position. This latches the upper track member to the lower track member in the new horizontally adjusted position.

When it is desired to move the seat from a horizontally adjusted position or initial starting position to a forwardly displaced easy entry position, the operator tilts the seat back 98 forwardly or counterclockwise as viewed in FIG. 1. The lever 100 rotates with the seat back and shifts the cable 114 rearwardly in sheath 116 to rotate the cam plate 102 clockwise as viewed in FIGS. 2 and 10 or counterclockwise as viewed in FIG. 11. The cam edge 108 of the cam plate engages the cam edge portion 68 of the latch member 60. This rotates the latch member 60 counterclockwise about the pivot 62 from its position shown in FIG. 3 to its position shown in FIG. 5 against the bias of the spring arm 76. When the latch arm 64 is moved out of engagement with opening 42, the upper track member 12 can be shifted forwardly with respect to the lower track member 14 to the easy entry position. Once the upper track member 12 has started to move forwardly and opening 42 is out of alignment with arm 64, the seat back can be returned to the upright position if desired. The sliding engagement of the latch arm 64 with the inner surface of the control plate 32 permits continued forward sliding movement of the upper track member. As the upper track member 12 is returned from the easy entry position to the initial starting position, the seat back is returned upright to its position shown in FIG. 1, if not already returned, and the upper track member 12 moved rearwardly. As soon as the latch arm 64 comes into registry with the opening 42, the spring arm 67 moves this latch arm within the opening to again latch the seat in its initial starting position.

Thus this invention provides an improved easy entry seat adjuster.

The embodiments of the invention in which an exclusive property or privilege is claimed are defined as follows:

1. An easy entry seat adjuster comprising, in combination, a pair of track members, means slidably mounting one track member on the other track member for longitudinal adjustment relative thereto, one track member having an opening therein and the other track member having a plurality of openings therein, each pairable with the opening of the one track member to define a horizontally adjusted position of the track members, a latch carrier slidably mounted on the track members, latch means movably mounted on the carrier for movement in a plane longitudinal of the track members and including a pair of latch arms extending oppositely of each other, one latch arm being movable into and out of the opening of the one track member and the other latch arm being movable into and out of each of the openings of the other track member, means interconnecting the carrier and the latch means and normally locating the latch means with one latch arm extending into the one opening and the other latch arm extending into a paired opening of the other track member to releasably latch the track members to each other in a longitudinal adjusted position, means moving the latch means relative to the carrier to move the one arm further into the one opening as the other latch arm moves out of the opening of the other track member to permit movement of the one track member, the carrier and the latch means as a unit relative to the other track member to a new adjusted position relative thereto, the reengagement of the other latch arm in another opening of the other track member releasably latching the track members to each other in the new adjusted position, and means for moving the latch means relative to the carrier to move the other latch arm further into the opening of the other track member as the one latch arm moves out of the opening in the one track member to permit movement of the one track member relative to the other track member, the carrier and the latch means from an initial starting position to an easy entry position, return of the one track member to the initial starting position reengaging the one latch arm in the opening of the one track member to releasably latch the one track member to the other track member in the initial starting position.

2. An easy entry seat adjuster comprising, in combination, a pair of track members, means slidably mounting one track member on the other track member for longitudinal adjustment relative thereto, one track member having an opening therein and the other track member having a plurality of openings therein, each pairable with the opening of the one track member to define a horizontally adjusted position of the track members, a latch carrier slidably mounted on the track members, a latch member rotatably mounted on the carrier and including a pair of latch arms extending oppositely of each other, one latch arm being movable into and out of the opening of the one track member and the other latch arm being movable into and out of each of the openings of the other track member, resilient means interconnecting the carrier and the latch member and normally locating the latch member with one latch arm extending into the one opening and the other latch arm exending into a paired opening of the other track member to releasably latch the track members to each other in a longitudinal adjusted position, means rotating the latch member in one direction relative to the carrier to move the one arm further into the one opening as the other latch arm moves out of the opening of the other track member to permit movement of the one track member, the carrier and the latch member as a unit relative to the other track member to a new adjusted position relative thereto, the reengagement of the other latch arm in another opening of the other track member releasably latching the track members to each other in the new adjusted position, and means rotating the latch member in an opposite direction relative to the carrier to move the other latch arm further into the opening of the other track member as the one latch arm moves out of the opening in the one track member to permit movement of the one track member relative to the other track member, the carrier and the latch member from an initial starting position to an easy entry position, return of the one track member to the initial starting position reengaging the one latch arm in the opening of the one track member to releasably latch the one track member to the other track member in the initial starting position.

3. An easy entry seat adjuster comprising, in combination, a pair of relatively movable track members, one track member having an opening therein and the other track member having a plurality of openings therein, each pairable with the opening of the one track member, a latch carrier slidably mounted on the track members, a latch member rotatably mounted on the carrier and including a pair of latch arms, one latch arm being movable into and out of the opening of the one track member and the other latch arm being movable into and out of each of the openings of the other track member, means interconnecting the carrier and the latch member and normally locating the latch member in a first latched position wherein one latch arm extends into the one opening and the other latch arm extends into a paired opening of the other track member to releasably latch the carrier and the track members to each other in one position, first operator controlled means rotating the latch member relative to the carrier to a second latch position wherein one arm remains in the one opening and the other latch arm moves out of the paired opening of the other track member to permit movement of the one track member, the carrier and the latch member as a unit relative to the other track member to an adjusted position relative thereto, the reengagement of the other latch arm in another paired opening of the other track member releasably latching the track members to each other in the adjusted position, and second operator controlled means for rotating the latch member relative to the carrier to a third latched position wherein the other latch arm remains in the paired opening of the other track member and the one latch arm moves out of the opening in the one track member to permit movement of the one track member relative to the other track member, the carrier and the latch member from an initial starting position to an easy entry position, return of the one track member to the initial starting position reengaging the one latch arm in the opening of the one track member to releasably latch the one track member to the other track member in the initial starting position.

4. The combination recited in claim 3 wherein the first operator controlled means is cammingly engageable with the latch member to rotate the latch member from the first latched position to the second latched position, and the locating means resiliently resists rotation of the latch member from the first latch position and returns the latch member to such position upon release of the first operator controlled means.

5. The combination recited in claim 3 wherein the second operator controlled means is cammingly engageable with the latch member to rotate the latch member from the first latched position to the third latched position, and the locating means resiliently resists movement of the latch member from the first latched position and returns the latch member to such position upon release of the second operator controlled means.

6. The combination recited in claim 3 wherein the first and second operator controlled means are selectively and alternately engageable with the latch member to rotate the latch member from the first latched position to the respective second and third latched positions.

7. An easy entry seat adjuster comprising, in combination, a pair of relatively movable track members, a latch carrier slidably mounted on both track members, a latch member rotatably mounted on the carrier for movement to a plurality of latched positions, resilient means interconnecting the carrier and the latch member and normally biasing the latch member to a first latched position wherein the latch member engages both track members to releasably latch the track members to each other in an adjusted position, first operator controlled means releasably engageable with the latch member to move the latch member against the bias of the resilient means to a second latched position wherein the latch member unlatches the carrier from the other track member and latches the carrier to the one track member to permit movement of the one track member, the carrier and the latch member as a unit relative to the other track member to a new adjusted position relative thereto, release of the first operator controlled means permitting the resilient means to return the latch member to the first latched position to releasably latch the track members to each other in the new adjusted position, and second operator controlled means releasably engageable with the latch member to move the latch member against the bias of the resilient means to a third latched position wherein the latch member unlatches the carrier from the one track member and latches the carrier to the other track member to permit movement of the one track member relative to the other track member, the carrier and the latch member from an initial starting postion to an easy entry position, return of the one track member to the initial starting position and release of the second operator controlled means permitting the resilient means to return the latch member to the first latched position to releasably latch the track members to each other in the initial starting position.

8. The combination recited in claim 7 wherein the second operator controlled means includes a cam member pivotally supported on the one track member for movement between neutral position to an operating position to move the latch member from the first latched position to the third latched position, and means independent of the second operator controlled means for moving the cam member from the operating position to the neutral position upon return movement of the one track member from the easy entry position to the initial starting relative position to permit the locating means to move the latch member from the unlatched position with respect to the one track member to latched position with respect thereto.

* * * * *